Patented June 25, 1940

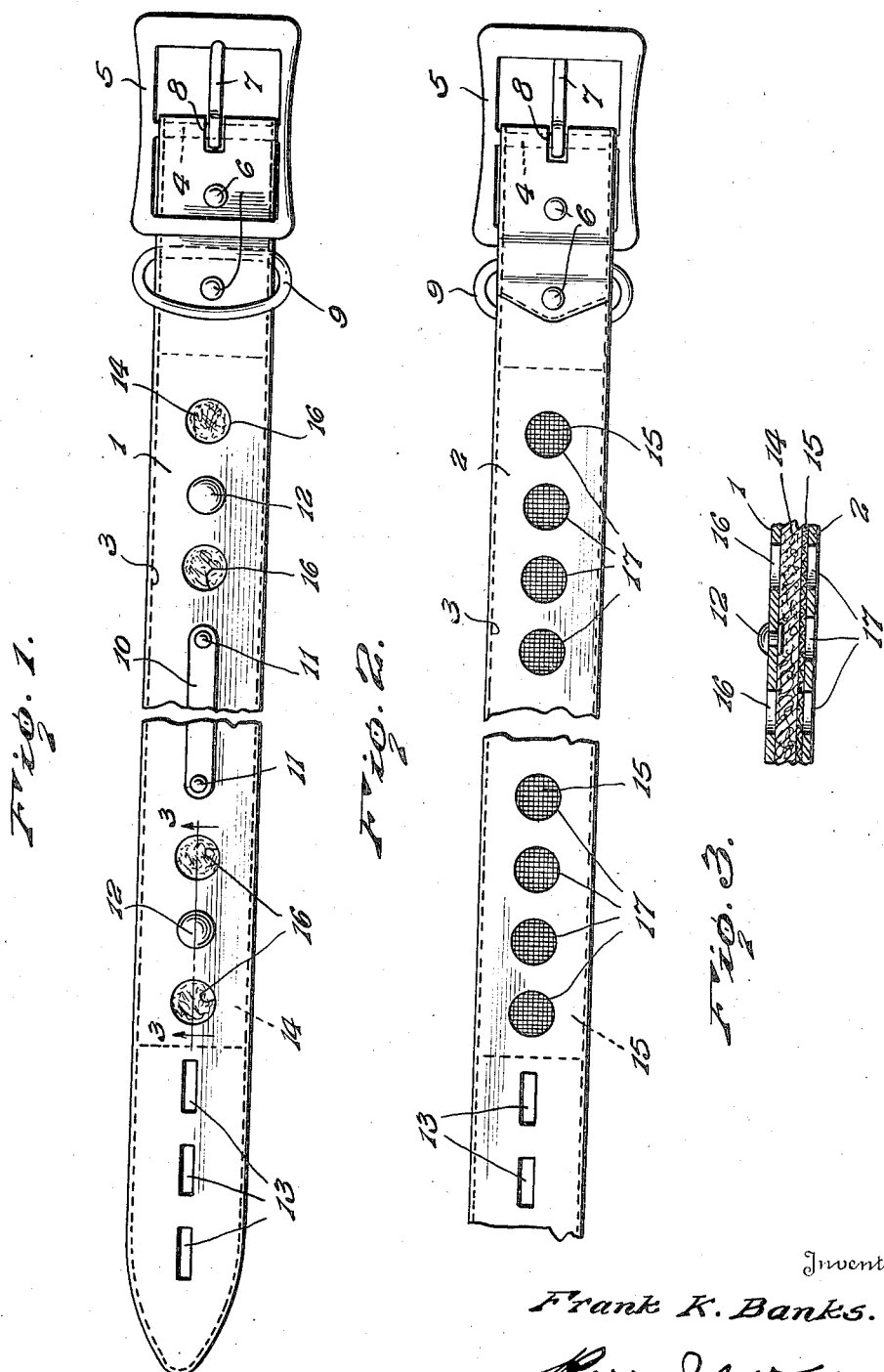

2,205,711

UNITED STATES PATENT OFFICE 2,205,711

INSECTICIDE COLLAR FOR ANIMALS

Frank K. Banks, Atlanta, Ga.

Application May 6, 1939, Serial No. 272,225

1 Claim. (Cl. 119—106)

This invention relates to collars of the type worn by dogs, cats, and other animals, and it is one object of the invention to provide a collar which, when secured about the animal's neck, will serve as a carrier for an insecticide and thus constitute means for exterminating fleas and other insects with which the animal may be infested, as well as serving as means for preventing such insects from gathering upon the animal.

Another object of the invention is to so form the collar that a pad carrying the insecticide is enclosed within the collar, which is formed with a suitable number of openings through which fumes from the insecticide may pass.

Another object of the invention is to provide a screen so located within the collar that portions of the screen will be disposed between the insecticide pad and inner openings of the collar, thus serving to prevent hair of the animal from making contact with the pad when the collar is secured about its neck.

And still another object of the invention is to so form the collar that it will have the appearance of an ordinary collar and not detract from the appearance of the animal.

The invention is illustrated in the accompanying drawing, wherein:

Figure 1 is a view looking at the outer surface of the improved collar.

Figure 2 is a view looking at the inner surface thereof.

Figure 3 is a fragmentary sectional view taken along the line 3—3 of Figure 1.

The improved insecticide collar constituting the subject matter of this invention is preferably formed of leather, although other materials which are sufficiently flexible, may be employed. The collar may be of any desired length and width and has its outer and inner plies 1 and 2 sewed together by a line of stitching 3 adjacent their margins.

One end portion of the collar is folded back upon itself about the cross bar 4 of the buckle 5, in the usual manner, and secured by rivets 6, with the bill 7 of the buckle passing through the slot 8 formed in the strap or body portion of the collar. The usual ring 9 for engagement by the hook of a leash is provided and held in place by the rivets. There has also been provided a name plate 10, secured to the outer ply by rivets 11 and, in additon, there have been provided a number of ornamental studs riveted through the outer ply. Slits 13 to receive the bill 9 of the buckle, are formed through the free end portion of the collar.

During formation of the collar, a pad 14, which is absorbent and impregnated with an insecticide, is disposed between the inner and outer plies 1 and 2 and secured in place by the stitching 3. This medicated pad is of appreciable thickness, as shown in Figure 3, and between the pad and the inner ply is disposed a strip of wire screening 15 corresponding in dimensions to the dimensions of the pad and also secured by the stitching.

Openings 16 and 17 are formed through the plies in spaced relation to each other longitudinally thereof and constitute vents through which fumes from the medicated pad escape to kill or drive off fleas and other insects from the animal and prevent insects from gathering upon the animal. The openings 16 and 17 are in opposed relation to each other, as shown in Figure 3, except at the points where the studs 12 and the name plate are applied to the outer ply, thus permitting a good circulation of air through the collar and the medicated pad.

In view of the fact that the strip of screening extends between the pad and the openings 17, the pad will be prevented from making contact with the hair or skin of the animal wearing the collar, and danger of injury by direct application of the insecticide to the animal will be eliminated. It should also be noted that since the pad and the strip of screening terminate in spaced relation to ends of the collar, as indicated by dotted lines in Figures 1 and 2, a certain amount of stiffness may be imparted to the collar and hold it in shape about the animal's neck without causing the end portions to be of such stiffness that engagement of the bill 7 of the buckle through the slits 13 will be difficult. This also eliminates exposure of the pad through the slits.

Having thus described the invention, what is claimed is:

An animal collar comprising inner and outer plies of material in united relation at their ends, openings of substantial size being formed in the plies intermediate their ends, said intermediate portions of the plies having the adjacent confronting walls thereof spaced from each other, a pad abutting the inner face of the outer ply, a screen abutting the inner faces of the pad and the inner ply and bridging the openings in the intermediate portion of the inner ply, said screen constituting means to maintain the pad out of contact with the body of the animal, and an insecticide in the pad.

FRANK K. BANKS.